United States Patent [19]

Fujino et al.

[11] 3,951,840

[45] Apr. 20, 1976

[54] STABLE BLEACHING COMPOSITION

[75] Inventors: Takashi Fujino, Yokohama; Makoto Yamanaka, Koganei; Keiichi Deguchi, Funabashi, all of Japan

[73] Assignee: Kao Soap Co., Ltd., Tokyo, Japan

[22] Filed: Apr. 18, 1974

[21] Appl. No.: 461,906

[30] Foreign Application Priority Data

Apr. 26, 1973 Japan .............................. 48-48036

[52] U.S. Cl. .............................. 252/102; 252/95; 252/99; 252/186; 252/DIG. 11; 252/541

[51] Int. Cl.$^2$ ...................... C01B 3/02; C01B 3/26; C01B 3/39

[58] Field of Search ............... 252/186, 102, 99, 95, 252/DIG. 11, 541, 542, 543, 403

[56] References Cited

UNITED STATES PATENTS

| | | | |
|---|---|---|---|
| 1,559,599 | 11/1925 | Wintsch | 252/186 X |
| 3,154,494 | 10/1964 | Speak et al. | 252/186 X |
| 3,766,078 | 10/1973 | Kowalski | 252/186 X |

*Primary Examiner*—Benjamin R. Padgett
*Assistant Examiner*—David Leland
*Attorney, Agent, or Firm*—Woodhams, Blanchard and Flynn

[57] ABSTRACT

A bleaching composition comprising a chelating agent capable of forming a water-insoluble or hardly water-soluble chelate compound with copper and/or iron and an inorganic peroxide bleaching agent.

8 Claims, No Drawings

STABLE BLEACHING COMPOSITION

BACKGROUND OF THE INVENTION

1. Field of the Invention

This invention relates to a stable bleaching composition and also a detergent composition containing such bleaching composition.

2. Description of the Prior Art

It is known in the art that inorganic peroxide bleaching agents capable of releasing active oxygen in an aqueous solution are used as bleaching agents or bleaching detergents for household or industrial uses.

Among these bleaching agents, sodium perborate has a good storage stability when used as a bleaching agent or in the form incorporated with a detergent and, during storage, it hardly causes decomposition which extinguishes oxygen effective for bleaching.

However, the bleaching effect of sodium perborate cannot be sufficiently exerted if the temperature is less than 60°C., and it fails to exhibit a sufficient effect in Japan where the washing is customarily conducted at low temperatures. Therefore, the development of oxygen type bleaching agents having good solubility and high bleaching activity even at low temperatures has been desired in the art.

It is known that some inorganic salts such as alkali carbonates and alkali phosphates form adducts with hydrogen peroxide and these adducts are superior to sodium perborate with respect to bleaching activity and solubility at low temperatures. However, as is well known in the art, in case such an adduct is incorporated into a powdery detergent or bleaching agent under the weather conditions in the summer in Japan such as a temperature of about 30°C. and a relative humidity of about 80%, the occurrence of decomposition is remarkable and, hence, a sufficient bleaching effect cannot be obtained. Various attempts have heretofore been made to improve the poor storage stability, namely, the fatal defect of inorganic peroxide bleaching agents, and the typical instances of such attempts are as follows:

1. A method comprising adding an inorganic salt known as a stabilizer for a peroxide, such as sodium silicate, magnesium silicate, sodium chloride, sodium sulfate and the like.
2. A method comprising incorporating in a peroxide an organic metal blocking agent of the water-soluble polyaminocarboxylic acid type, such as ethylenediamine tetra-acetate (E.D.T.A.), nitrilotriacetate (N.T.A.) and the like.
3. A method comprising granulating or coating a peroxide with a water-soluble or water-insoluble compound such as paraffin wax, polyethylene glycol, alkanol amide and the like.

According to any of the foregoing methods, however, the decomposition of the peroxide is caused to occur considerably during storage and a sufficient stability cannot be obtained.

SUMMARY OF THE INVENTION

It is therefore a primary object of this invention to provide a peroxide bleaching agent composition having a high storage stability that is not attainable by the conventional methods.

This invention relates to a powdery bleaching composition comprising as a main ingredient an inorganic peroxide bleaching agent or a powdery bleaching detergent formed by adding a surface active agent to the above bleaching composition, and this invention is characterized in that a substance capable of forming a water-insoluble or poorly water-soluble precipitate with copper and/or iron (particularly a chelating agent) is incorporated in the above bleaching composition or bleaching detergent composition.

It is indispensable that the chelating agent used should form a water-insoluble or poorly water-soluble precipitate (i.e. chelating compound) with copper or iron. As such metal chelating agents, there can be mentioned, for example, salicylaldoxime, α-benzoinoxime, cupferron, dithizone, aluminon, dimethylglyoxime, sulfosalicylic acid, mercaptobenzothiazole, oxine and the like. In general, metal chelating agents are divided into the type forming a water-soluble metal chelate compound and the type forming a water-insoluble or poorly water-soluble metal chelate compound and giving a precipitate in water. The former type compound is generally called an "inhibitor" or "blocking agent", and polyaminocarboxylic acids and the like belong to this type. Typical instances of the chelating agent of this type are ethylenediamine tetra-acetate (E.D.T.A.) and nitrilotriacetate (N.T.A.). It has been known that these inhibitors are useful as decomposition-preventing agents for peroxides and the above conventional method (2) utilizes the above property of the inhibitor of this type. However, the decomposition-preventing effect of these inhibitors is not sufficient, and this effect is particularly lowered when the peroxide is used in the state incorporated in a detergent or the like. In contrast, the metal chelating agent used in this invention belongs to the latter type. As is apparent from the results shown in the Examples given hereinafter, the chelating agent of this invention exerts a high decomposition-preventing effect that is not attainable according to the conventional methods when incorporated in an inorganic peroxide bleaching agent.

The characteristic feature of this invention resides in the finding that the chelating agent of this invention has a high decomposition-preventing effect that is not attainable according to the conventional methods when incorporated in a powdery peroxide bleaching agent.

As the inorganic peroxide bleaching agents, there are employed the adducts of hydrogen peroxide to such salts as carbonates, borates, phosphates, silicates and the like (especially sodium salts). These inorganic peroxides are capable of releasing hydrogen peroxide in an aqueous solution and, as such peroxides, there can be mentioned sodium perborate, sodium percarbonate, sodium peroxypyrophosphate, sodium peroxysilicate, magnesium peroxysilicate and sodium peroxytripolyphosphate.

A hydrogen peroxide adduct to a borate (i.e. perborate) has inherently a relatively good storage stability, but, when the chelating agent of this invention is incorporated in such adduct, the storage stability is further improved. The decomposition-preventing effect attained by the addition of the chelating agent of this invention is especially remarkable when it is incorporated in a bleaching agent having a high bleaching effect at low temperatures, such as sodium percarbonate.

Also when a powdery bleaching detergent composition is prepared by adding a known detergent component such as various surface active agents and an organic or inorganic builder to the bleaching composition of this invention, an excellent effect of preventing the decomposition of the inorganic peroxide bleaching agent can be retained and a bleaching detergent having an excellent storage stability can be obtained. Anionic, non-ionic and ampholytic surface active agents can be used as the surface active agent, and in special cases, cationic surface agents can also be used. As surface active agents, there can be mentioned, for example, anionic surfactants such as sodium alkyl sulfates of 10 to 20 carbon atoms, sodium salts of higher fatty acids of 10 to 20 carbon atoms, sodium alkylbenzenesulfonates containing an alkyl group of 10 to 20 carbon atoms, sodium salts of polyoxyethylene alkyl ether sulfuric esters containing an alkyl group of 10 to 20 carbon atoms and sodium salts of polyoxyethylene alkylphenyl ether sulfuric esters containing an alkyl group of 6 to 10 carbon atoms; or nonionic surfactants such as polyoxyethylene alkyl ethers containing an alkyl group of 10 to 20 carbon atoms and polyoxyethylene alkylphenyl ethers containing an alkyl group of 6 to 10 carbon atoms. It is also possible to add inorganic builders such as sodium tripolyphosphate, sodium sulfate, sodium silicate and the like, resoiling-preventive agents such as carboxymethyl cellulose, polyvinyl pyrrolidone, polyethylene glycol and the like, and bleaching agent-activating agents such as N-acyl compounds and organic acid anhydrides. Still further, such additives as enzymes, antioxidants, fluorescent dyes, perfumes and the like can be incorporated.

The amount of the chelating agent to be incorporated in the bleaching composition of this invention varies depending on various conditions such, for example, as the kind of the metal of the inorganic peroxide, but, in general, the chelating agent is incorporated in an amount of 0.05 to 5% by weight based on the inorganic peroxide bleaching agent. When the bleaching composition of this invention is used for the preparation of a bleaching detergent composition, the amount of the chelating agent to be added is not particularly critical for the same reason as mentioned above, and, in general, it is incorporated in an amount of 0.1 to 5% by weight based on the inorganic peroxide bleaching agent.

The present invention will be further illustrated by reference to the following Examples.

EXAMPLE 1

Inorganic peroxide bleaching agent compositions prepared in the following manner were tested with respect to the storage stability.

[Preparation of Bleaching Agent]

Sodium carbonate, sodium pyrophosphate and sodium borate were employed as the inorganic salt. 100 Grams of the inorganic salt were dissolved in water, and 0.2 gram of salicylaldoxime as the chelating agent was added to the resulting solution. Then, 30% aqueous hydrogen peroxide was added to the mixture of effect the reaction. The reaction mixture was then cooled to 0 to 5°C. and the resulting precipitate of the hydrogen peroxide adduct and the chelate compound was recovered by filtration, and dried at about 30°C. under a reduced pressure of 20 mm Hg to obtain a powdery peroxide bleaching agent composition.

[Storage Stability Test]

The thus prepared peroxide bleaching agent composition was allowed to stand at a temperature of 40°C. and a relative humidity of 80%, and after the lapse of the prescribed period, the available oxygen concentration was determined. The ratio of the obtained concentration of the remaining available oxygen to the original available oxygen concentration was expressed in the percentage, and the remaining activity was evaluated based on this percentage value. For comparison, the remaining activity was determined in the same manner with respect to a peroxide bleaching agent prepared without the addition of the chelating agent.

Results are shown in Table 1.

Table 1

| Peroxide Bleaching Agent | Standing Period (days) | Remaining Activity (%) chelating agent was added | Remaining Activity (%) chelating agent was not added |
|---|---|---|---|
| sodium percarbonate | 6 | 98 | 70 |
| sodium peroxypyrophosphate | 4 | 74 | 67 |
| sodium perborate | 14 | 95 | 87 |

From the foregoing results, it will readily be understood that the peroxide bleaching agent composition of this invention comprising a chelating agent capable of forming a poorly water-soluble chelate compound has an excellent storage stability over conventional bleaching compositions.

EXAMPLE 2

Powdery bleaching detergents were prepared by adding 15 parts by weight of sodium percarbonate ($Na_2CO_3.2/3H_2O_2$) to a detergent (A) of the following composition incorporated with a chelating agent which forms a water-soluble chelate compound with copper or iron or a chelating agent which forms a water-insoluble or poorly water-soluble chelate compound with copper or iron indicated below. The bleaching detergents were allowed to stand for 10 days at a temperature of 40°C. and a relative humidity of 80%, and with respect to each detergent, the available oxygen concentration of the peroxide left after the lapse of 10 days was measured according to a conventional method.

[Detergent (A)]

| Component | Parts by Weight |
|---|---|
| sodium alkylbenzenesulfonate | 20.0 |
| sodium tripolyphosphate | 20.0 |
| sodium silicate | 5.0 |
| sodium carbonate | 1.0 |
| carboxymethyl cellulose | 1.0 |
| chelating agent (indicated in Table 2) | 1.0 |
| fluorescent dye and perfume | 0.7 |
| sodium sulfate | 41.3 |
| water | 10.0 |

Results of the measurement are shown in Table 2.

Table 2

| Chelating Agent | Remaining Activity (%) | Water Solubility* of Chelate Compound |
|---|---|---|
| Comparison | | |
| not added | 14 | |
| E.D.T.A. | 15 | + |
| N.T.A. | 25 | + |
| (sodium perborate**) | 62 | |
| This Invention | | |
| salicylaldoxime | 71 | − |
| cupferron | 59 | − |
| dithizone | 41 | − |
| aluminon | 50 | − |

Notes:
*the mark "+" indicates "water-soluble" and the mark "−" indicates "water-insoluble or poorly water-soluble".
**a composition formed by incorporating 15 parts of sodium perborate to 85 parts Table 2-continued

| Chelating Agent | Remaining Activity (%) | Water Solubility* of Chelate Compound |
|---|---|---|

of the detergent (A) free of a chelating agent was similarly allowed to stand and tested.

From the results shown above, it will readily be understood that the bleaching detegent composition incorporated with the bleaching composition of this invention has an excellent storage stability over the detergents incorporated with a chelating agent which forms a watersoluble metal chelate compound and the stability of the bleaching composition of this invention is superior or comparable to that of sodium perborate which is a stable bleaching agent. As is apparent from the comparison of this Example with Example 1, though the degree of decomposition of a peroxide bleaching agent becomes conspicuous when incorporated in a detergent, the chelating agent of this invention exhibits an excellent effect especially in such case.

EXAMPLE 3

A powdery detergent having the same composition as that of the detergent (A) used in Example 2 except that no chelating agent was added was employed. A composition (B) prepared by adding sodium percarbonate to the above powdery detergent and a composition (C) prepared by adding an improved sodium percarbonate mixture consisting of 100 parts by weight of sodium percarbonate and 5 parts by weight of salicylaldoxime to the above powdery detergent were subjected to the storage stability test by allowing them to stand under the same conditions as in Example 2.

The mixing ratio of the detergent and bleaching agent and the test results are shown in Table 3.

Table 3

| | Composition (B) | Composition (C) |
|---|---|---|
| Powdery detergent (A) (no chelating agent) | 85% | 85% |
| Improved sodium percarbonate mixture | — | 15% |
| Sodium percarbonate | 15% | — |
| Remaining activity | 16% | 68% |

From the above results, it will readily be understood that the composition (C) incorporated with the improved sodium percarbonate mixture of this invention has an excellent stability over the comparative composition (B) incorporated with ordinary sodium percarbonate.

The embodiments of the invention in which an exclusive property or privilege is claimed are defined as follows:

1. A powdery bleaching composition comprising an inorganic peroxide bleaching agent selected from the group consisting of sodium perborate, sodium percarbonate, sodium peroxypyrophosphate, sodium peroxysilicate and sodium peroxytripolyphosphate, and a chelating agent selected from the group consisting of salicylaldoxime, α-benzoinoxime, cupferron, dithizone, aluminon, dimethylglyoxime, sulfosalicylic acid, mercaptobenzothiazole and oxine, the amount of said chelating agent being from 0.05 to 5 percent by weight, based on the weight of the inorganic peroxide bleaching agent.

2. A powdery bleaching detergent composition consisting essentially of a powdery detergent blended with a powdery bleaching composition as claimed in claim 1, wherein the amount of said chelating agent is from 0.1 to 5 percent by weight, based on the weight of the inorganic peroxide bleaching agent.

3. A powdery bleaching composition as claimed in claim 1 in which said chelating agent consists essentially of salicylaldoxime.

4. A powdery bleaching composition as claimed in claim 1 in which said bleaching agent consists essentially of sodium percarbonate.

5. A powdery bleaching composition as claimed in claim 4 in which said chelating agent consists essentially of salicylaldoxime.

6. A powdery bleaching composition as claimed in claim 4 in which said chelating agent consists essentially of cupferron.

7. A powdery bleaching composition as claimed in claim 4 in which said chelating agent consists essentially of dithizone.

8. A powdery bleaching composition as claimed in claim 4 in which said chelating agent consists essentially of aluminon.

* * * * *